United States Patent
Smith et al.

(10) Patent No.: US 11,496,352 B2
(45) Date of Patent: Nov. 8, 2022

(54) HETEROGENEOUS AND/OR HOSTED PHYSICAL LAYER MANAGEMENT SYSTEM

(71) Applicants: CommScope Technologies LLC, Hickory, NC (US); CommScope Connectivity UK Limited

(72) Inventors: Trevor D. Smith, Eden Prairie, MN (US); Kamlesh G. Patel, Chanhassen, MN (US); Gene Malone, Kernersville, NC (US); David Thomas, Chester (GB)

(73) Assignees: CommScope Technologies LLC, Hickory, NC (US); CommScope Connectivity UK Limited, London (GB)

( * ) Notice: Subject to any disclaimer, the term of this patent is extended or adjusted under 35 U.S.C. 154(b) by 341 days.

(21) Appl. No.: 16/141,784

(22) Filed: Sep. 25, 2018

(65) Prior Publication Data

US 2019/0028324 A1 Jan. 24, 2019

Related U.S. Application Data

(63) Continuation of application No. 13/939,805, filed on Jul. 11, 2013, now Pat. No. 10,091,050.

(Continued)

(51) Int. Cl.
*H04L 41/022* (2022.01)
*H04L 67/10* (2022.01)
(Continued)

(52) U.S. Cl.
CPC ............ *H04L 41/022* (2013.01); *H04L 67/10* (2013.01); *H04L 41/0853* (2013.01); *H04L 41/12* (2013.01)

(58) Field of Classification Search
CPC ... H04L 41/022; H04L 41/12; H04L 41/0853; H04L 67/10
See application file for complete search history.

(56) References Cited

U.S. PATENT DOCUMENTS 6,516,345 B1  2/2003  Kracht
6,976,054 B1  12/2005  Lavian et al.
(Continued)

OTHER PUBLICATIONS

European Patent Office; "Communication pursuant to Article 94(3) EPC, from EP Application No. 13815986.8, dated Jan. 16, 2017"; from Foreign Counterpart of U.S. Appl. No. 13/939,805; pp. 1-7; dated Jan. 16, 2017; Published: EP.

(Continued)

*Primary Examiner* — Jung H Park
(74) *Attorney, Agent, or Firm* — Fogg & Powers LLC

(57) ABSTRACT

One embodiment is directed to a heterogeneous physical layer management system comprising first devices, each comprising first physical layer information acquisition technology to obtain physical layer information about cabling attached to the first devices. The system further comprises second devices, each comprising second physical layer information acquisition technology to obtain physical layer information about cabling attached to the second devices, wherein the second physical layer information acquisition technology differs from the first physical layer information acquisition technology. The system further comprises a common management application communicatively coupled to the first devices and the second devices, wherein the common management application is configured to aggregate physical layer information from the first devices and the second devices. Another embodiment is directed to providing a physical layer management application as a service hosted by a third party. Other embodiments are disclosed.

20 Claims, 2 Drawing Sheets

Related U.S. Application Data

(60) Provisional application No. 61/670,515, filed on Jul. 11, 2012.

(51) Int. Cl.
*H04L 41/0853* (2022.01)
*H04L 41/12* (2022.01)

(56) References Cited

U.S. PATENT DOCUMENTS

| | | | |
|---|---|---|---|
| 7,586,942 | B2 | 9/2009 | Golasky et al. |
| 8,824,489 | B1 | 9/2014 | Pannell |
| 10,091,050 | B2 | 10/2018 | Smith et al. |
| 2003/0046339 | A1 | 3/2003 | Ip |
| 2005/0108370 | A1 | 5/2005 | Sarraf et al. |
| 2005/0270986 | A1 | 12/2005 | Watanabe et al. |
| 2006/0277324 | A1 | 12/2006 | Aldereguia et al. |
| 2007/0294395 | A1 | 12/2007 | Strub et al. |
| 2008/0181136 | A1 | 7/2008 | Watanabe et al. |
| 2009/0119421 | A1 | 5/2009 | Souders et al. |
| 2010/0120264 | A1 | 5/2010 | Caveney et al. |
| 2010/0157516 | A1 | 6/2010 | Doorhy et al. |
| 2010/0165980 | A1 | 7/2010 | Sargor et al. |
| 2010/0211664 | A1* | 8/2010 | Raza ............ H01R 13/6658 709/223 |
| 2010/0211665 | A1 | 8/2010 | Raza et al. |
| 2011/0097925 | A1* | 4/2011 | Caveney ............ H04Q 1/149 439/488 |
| 2011/0173315 | A1 | 7/2011 | Aguren |

OTHER PUBLICATIONS

European Patent Office; "Communication pursuant to Article 94(3) EPC, from EP Application No. 13815986.8, dated Jun. 28, 2017"; from Foreign Counterpart of U.S. Appl. No. 13/939,805; pp. 1-7; dated Jun. 28, 2017; Published: EP.

European Patent Office; "Extended European Search Report, from EP Application No. 13815986.8, dated Jan. 27, 2016"; from Foreign Counterpart of U.S. Appl. No. 13/939,805; pp. 1-11; Published: EP.

European Patent Office; "Extended European Search Report, from EP Application No. 18191747.7, dated Nov. 6, 2018"; from Foreign Counterpart of U.S. Appl. No. 13/939,805; pp. 1-10; dated Nov. 6, 2018; Published: EP.

International Searching Authority; Notification of Transmittal of the International Search Report and the Written Opinion of the International Searching Authority, from PCT Application No. PCT/US2013/050067, dated Oct. 31, 2013; from Foreign Counterpart of U.S. Appl. No. 13/939,805; pp. 1-13; Published: KR.

U.S. Patent and Trademark Office; "Advisory Action"; U.S. Appl. No. 13/939,805; dated Apr. 25, 2017; pp. 1-7; Published: US.

U.S. Patent and Trademark Office; "Advisory Action"; U.S. Appl. No. 13/939,805; dated Apr. 28, 2016; pp. 1-3; Published: US.

U.S. Patent and Trademark Office; "Final Office Action"; U.S. Appl. No. 13/939,805; dated Jan. 15, 2016; pp. 1-30; Published: US.

U.S. Patent and Trademark Office; "Final Office Action"; U.S. Appl. No. 13/939,805; dated Feb. 9, 2017; pp. 1-33; Published: US.

U.S. Patent and Trademark Office; "Final Office Action"; U.S. Appl. No. 13/939,805; dated Nov. 30, 2017; pp. 1-43; Published: US.

U.S. Patent and Trademark Office; "Notice of Allowance"; U.S. Appl. No. 13/939,805; dated May 24, 2018; pp. 1-13; Published: US.

U.S. Patent and Trademark Office; "Notice of Pre-Appeal Brief Decision"; U.S. Appl. No. 13/939,805; dated Apr. 19, 2018; pp. 1-2; Published: US.

U.S. Patent and Trademark Office; "Office Action"; U.S. Appl. No. 13/939,805; dated Jun. 6, 2017; pp. 1-34; Published: US.

U.S. Patent and Trademark Office; "Office Action"; U.S. Appl. No. 13/939,805; dated Jun. 30, 2016; pp. 1-36; Published: US.

U.S. Patent and Trademark Office; "Office Action"; U.S. Appl. No. 13/939,805; dated Jul. 17, 2015; pp. 1-20; Published: US.

European Patent Office, "Communication pursuant to Article 94(3) from EP Application No. 18191747.7", from Foreign Counterpart to U.S. Appl. No. 13/939,805, dated Oct. 8, 2019, pp. 1-7, Published: EP.

European Patent Office, "Communication pursuant to Article 94(3) from EP Application No. 18191747.7", from Foreign Counterpart to U.S. Appl. No. 13/939,805, dated Mar. 17, 2020, pp. 1-3, Published: EP.

European Patent Office, "Communication pursuant to Article 94(3) from EP Application No. 18191747.7", from Foreign Counterpart to U.S. Appl. No. 13/939,805, dated Aug. 7, 2020, pp. 1 through 4, Published: EP.

European Patent Office, "Extended European Search Report from EP Application No. 21203442.5", from Foreign Counterpart to U.S. Appl. No. 16/141,784, dated Jan. 19, 2022, pp. 1 through 10, Published: EP.

* cited by examiner

100

_HETEROGENEOUS AND/OR HOSTED PHYSICAL LAYER MANAGEMENT SYSTEM_

CROSS-REFERENCE TO RELATED APPLICATION

This application is a continuation of U.S. patent application Ser. No. 13/939,805, filed on Jul. 11, 2013, and titled "HETEROGENEOUS AND/OR HOSTED PHYSICAL LAYER MANAGEMENT SYSTEM," which issued as U.S. Pat. No. 10,091,050, which claims the benefit of U.S. Provisional Patent Application Ser. No. 61/670,515, filed on Jul. 11, 2012, the contents of each of which is hereby incorporated herein by reference.

BACKGROUND

Various types of physical layer management (PLM) technology can be used to track cross connections made at patch panels or other inter-connection devices. Generally, such PLM technology includes functionality to obtain information about what is connected to each service port of a patch panel or other inter-connection device and to communicate that information back to a management application. The management application stores the information and makes it available for various purposes (such as tracing connections and carrying out electronic work orders that specify how one or more connections are to be moved, added, or otherwise changed).

One type of PLM technology makes use of an Electrically Erasable Programmable Read-Only Memory (EEPROM) or other storage device that is integrated with or attached to a connector on a cable. The storage device is used to store information about the connector or cable along with other information. The port (or other connector) into which the associated connector is inserted is configured to read the information stored in the EEPROM when the connector is inserted into the port.

Another type of PLM technology makes use of so-called "ninth wire" technology. Ninth wire technology makes use of special cables that include an extra conductor or signal path (also referred to here as the "ninth wire") that is used for determining which port each end of the cable is inserted into.

Yet another type of PLM technology makes use of radio frequency identification (RFID) tags and readers. With RFID technology, an RFID tag is attached to or integrated with a connector on a cable. The RFID tag is used to store information about the connector or cable along with other information. The RFID tag can be read after the associated connector is inserted into a corresponding jack or other port using an RFID reader.

Another type of PLM technology infers connection information by sensing when connectors are inserted and removed from ports of the various devices.

However, systems and devices that use one type of PLM technology may not be designed to be used with systems and devices that use other types of PLM technology. As a result, it can be difficult to integrate systems and devices that use differing types of PLM technology.

Moreover, the management application that stores data obtained using such PLM technology is typically locally hosted by each particular enterprise that has deployed the PLM technology. However, some enterprises may not have the resources or the desire to locally host such a management application.

SUMMARY

One embodiment is directed to a heterogeneous physical layer management system comprising first devices each comprising first physical layer information acquisition technology to obtain physical layer information about cabling attached to the first devices and second devices each comprising second physical layer information acquisition technology to obtain physical layer information about cabling attached to the second devices, wherein the second physical layer information acquisition technology differs from the first physical layer information acquisition technology. The system further comprises a common management application communicatively coupled to the first devices and the second devices, wherein the common management application is configured to aggregate physical layer information from the first devices and the second devices.

Another embodiment is directed to a method comprising acquiring physical layer information from first devices using a first physical layer information acquisition technology and acquiring physical layer information from second devices using a second physical layer information acquisition technology, wherein the first physical layer information acquisition technology differs from the second physical layer information acquisition technology. The method further comprises aggregating physical layer information from the first devices and the second devices in a common management application.

Another embodiment is directed to a method comprising: acquiring physical layer information about a plurality of networks, each of the networks operated by a different enterprise; and aggregating physical layer information about each of the plurality of networks by a third party as a hosted service.

Another embodiment is directed to a server system that comprises one or more server computers operated by a third party. The one or more server computers are configured to aggregate physical layer information about each of a plurality of networks as a hosted service. Each of the plurality of networks is operated by a different enterprise.

Other embodiments are disclosed.

DRAWINGS

Like reference numbers and designations in the various drawings indicate like elements. The drawings are not necessarily drawn to scale.

DETAILED DESCRIPTION

Figure 1:
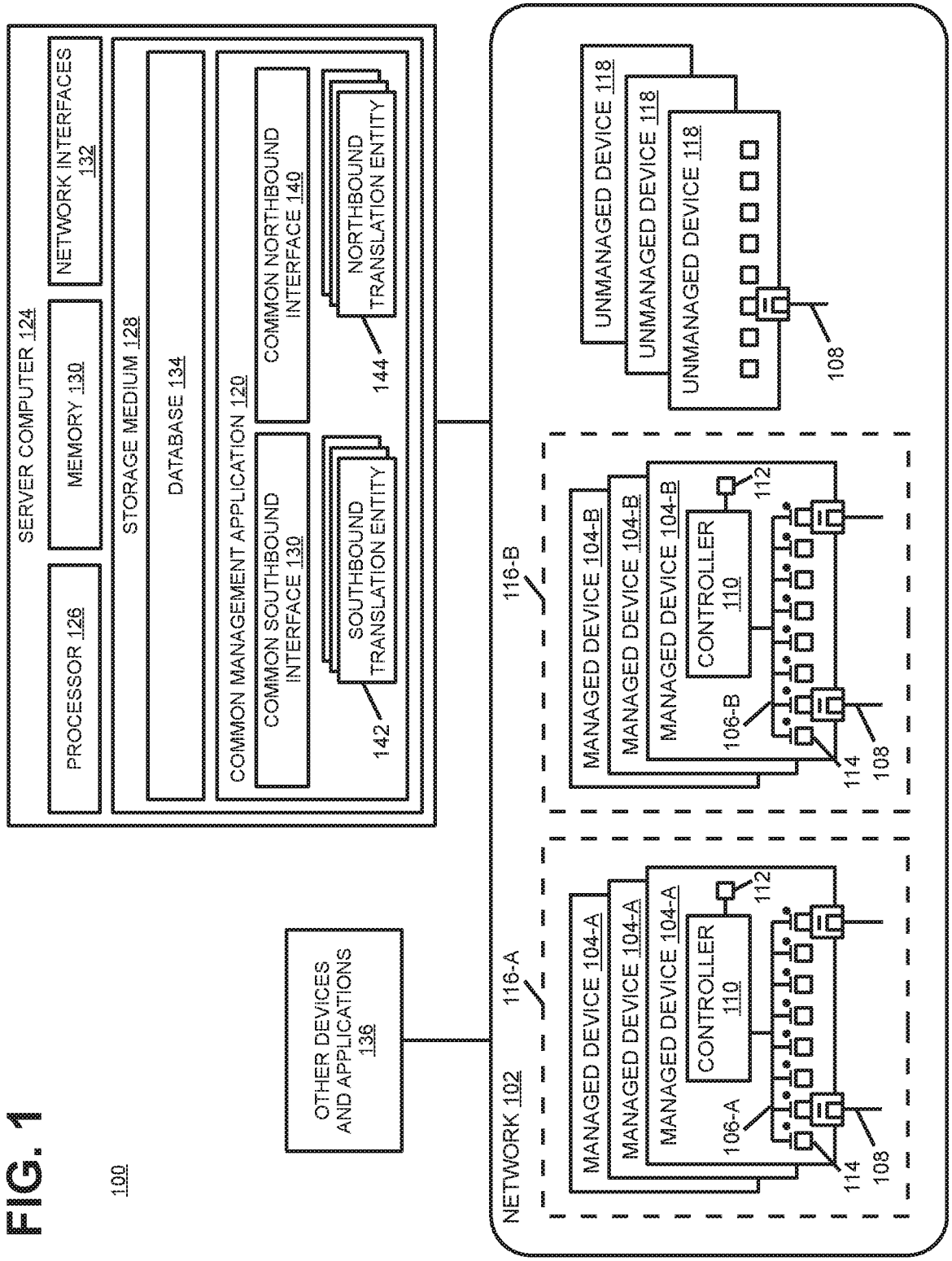
FIG. 1 is a block diagram of one exemplary embodiment of a heterogeneous PLM system.

FIG. 1 is a block diagram of one exemplary embodiment of a heterogeneous physical layer management (PLM) system 100.

The heterogeneous PLM system 100 is used to track physical layer information related to a network 102. As used herein, "physical layer information" comprises information about cabling that is used to implement the communication links that exist in the network 102.

In the exemplary embodiment shown in FIG. 1, the network 102 includes various managed devices 104. As used herein, a "managed" device 104 is a device 104 that includes some type of physical layer information data acquisition technology 106 for automatically obtaining physical layer information related to cabling 108 that is attached to that device 104. Examples of managed devices 104 include patch panels, optical distribution frames, splitter trays, switches, routers, etc., that include one or more of EEPROM-based PLM technology, RFID PLM technology, ninth wire PLM technology, and inference-based PLM technology. Other PLM technology can also be used.

In general, the physical layer information data acquisition technology 106 includes a controller or other programmable processor 110 that is configured to communicate captured physical layer information to a management application over the network 102. In the example shown in FIG. 1, each controller 110 is communicatively coupled to the network 102 by including a respective "management" or "non-service" port 112 in the associated managed device 104 that is separate from the "service" ports 114 of that device 104. However, the controller 110 in the managed devices 104 can be communicatively coupled to the network 102 using one or more of the "service" ports 114.

Multiple types of physical layer information data acquisition technology 106 are used in the network 102. In the exemplary embodiment shown in FIG. 1, a first subset 116-A of the managed devices 104-A use a first type of physical layer information data acquisition technology 106-A, and a second subset 116-B of the managed devices 104-B use a second type of physical layer information data acquisition technology 106-B. It is to be understood, however, that this is an example only and that a different number of physical layer information data acquisition technologies 106 can be used in a single network. Also, it is possible that a single managed device could use multiple types of physical layer information data acquisition technology.

The system 100 also includes unmanaged devices 118 (for example, switches, routers, and computers). As used herein, an "unmanaged" device 118 is a device 118 that does not include some type of physical layer information data acquisition technology 106 for automatically obtaining physical layer information related to cabling 108 that is attached to that device 118.

A common management application 120 is coupled to the network 102. In the exemplary embodiment shown in FIG. 1, the common management application 120 is implemented as software that executes on one or more server computers 124.

In the exemplary embodiment shown in FIG. 1, each server computer 124 comprises one or more programmable processors 126 for executing the software. The software comprises program instructions that are stored (or otherwise embodied) on or in an appropriate non-transitory storage medium or media 128 (such as flash or other non-volatile memory, magnetic disc drives, and/or optical disc drives) from which at least a portion of the program instructions are read by the programmable processor 126 for execution thereby. Although the storage media 128 is shown in FIG. 1 as being included in, and local to, the respective server computer 124, it is to be understood that remote storage media (for example, storage media that is accessible over the network 102) and/or removable media can also be used. Each server computer 124 also includes memory 130 for storing the program instructions (and any related data) during execution by the programmable processor 126. Memory 130 comprises, in one implementation, any suitable form of random access memory (RAM) now known or later developed, such as dynamic random access memory (DRAM). In other embodiments, other types of memory are used. Each server computer 124 also includes one or more network interfaces 132 for communicatively coupling the server computer 124 to the network 102.

The common management application 120 includes or is coupled to a database or other data store 134 for storing the physical layer information provided to it.

The common management application 120 also includes functionality that provides an interface for other devices or applications 136 to access the physical layer information maintained by the common management application 120. These other devices and applications 136 are also referred to here as the "other entities 136". This access can include retrieving information from the common management application 120 as well as supplying information to the common management application 120. In this example, the common management application 120 is implemented as "middleware" that is able to provide such other entities 136 with transparent and convenient access to the information maintained by the common management application 120. Because the common management application 120 aggregates information from the managed devices 104 in the network 102 and provides other entities 136 with access to such information, the other entities 136 do not need to individually interact with all of the managed devices 104 in the network 102, nor do such managed devices 104 need to have the capacity to respond to requests from such other entities 136.

In the following description, the interface between the common management application 120 and the managed devices 104 is referred to as the "southbound" interface, and the interface between the common management application 120 and the other entities 136 is referred to here as the "northbound" interface.

The common management application 120 is configured to implement a common southbound interface 138 and a common northbound interface 140 that enable managed devices 104 and other entities 136, respectively, to interact with the common management application 120 without regard to the particular physical layer information data acquisition technology 106 used and/or without regard to the particular vendor of the managed devices 104. For example, the common southbound interface 138 and the common northbound interface 140 can be implemented using an application programming interface (API) that can be used via a software development kit (SDK) that describes and documents the API (and the common southbound interface 138 and the common northbound interface 140).

In the exemplary embodiment shown in FIG. 1, some of the managed devices 104 are not specifically configured to communicate with the common management application 120 using the common southbound interface 138. That is, those managed devices 104 are configured to communicate with a management application that is specifically configured to work with only the particular type of physical layer information data acquisition technology 106 used in that device 104 and/or a management application provided by the particular vendor of those managed devices 104. For example, those managed devices 104 may be configured to use a proprietary protocol to communicate with such a management application (which is also referred to here as a "proprietary" management application). In the exemplary embodiment shown in FIG. 1, the common management application 120 includes a southbound translation entity 142 that translates messages sent to and received from such managed devices 104 to messages natively used in the common southbound interface 138.

Each southbound translation entity 142 is configured to send and receive the messages used in the relevant proprietary protocol to and from those managed devices 104 so that the southbound translation entity 142 and, as a result, the common management application 120, appear to those managed devices 104 to be the expected proprietary management application supported by the managed devices 104. In this way, the software or firmware executing on such managed devices 104 need not be changed in order to interact with the common management application 120 using the common southbound interface 138. Instead, only a southbound translation entity 142 need be installed on the one or more server computers 124 that run the common management application 120. This can reduce the amount of effort required to provide support for the common southbound interface 138 since there may be a vastly greater number of managed devices 104 in the network 100 than server computers 124 that need to be changed. Also, this tends to localize where such changes need to occur—that is, at the location where the server computers 124 are deployed as opposed to the many locations where the managed devices 104 are located.

In the exemplary embodiment shown in FIG. 1, some of the other entities 136 are not specifically configured to communicate with the common management application 120 using the common northbound interface 140. That is, those other entities 136 are configured to communicate with a management application that is specifically configured to work with only a particular type of physical layer information data acquisition technology 106 and/or a management application provided by a particular vendor. For example, those other entities 136 may be configured to use a proprietary protocol to communicate with such a proprietary management application.

In the exemplary embodiment shown in FIG. 1, the common management application 120 includes a northbound translation entity 144 that translates messages sent to and received from such other entities 136 to messages natively used in the common northbound interface 140. Each northbound translation entity 144 is configured to send and receive the messages used in the relevant proprietary protocol to and from those other entities 136 so that the northbound translation entity 144 and, as a result, the common management application 120, appear to those other entities 136 to be the expected proprietary management application supported by the other entities 136.

In other words, the northbound translation entity 144 makes managed devices 104 that use a first physical layer information data acquisition technology appear, from the perspective of an entity 136 that is configured to work with devices that use a second physical layer information data acquisition technology, to use the second data acquisition technology. In this way, the other entities 136 need not be changed in order to interact with the common management application 120 using the common northbound interface 140 and to interact with managed devices 104 that implement various physical layer information data acquisition technologies. Instead, only a northbound translation entity 144 need be installed on the one or more server computers 124 that run the common management application 120. This can reduce the amount of effort required to provide support for the common northbound interface 140 since there may be more other entities 136 in the network 100 than server computers 124 that need to be changed. Also, this tends to localize where such changes need to occur—that is, at the location where the server computers 124 are deployed as opposed to the many locations where the other entities 136 may be located or deployed.

In one implementation, the common management application 120 is implemented in a modular manner that uses a separate southbound translation entity 142 and/or northbound translation entity 144 for each proprietary protocol that must be translated to and from the common southbound interface 138 and common northbound interface 140. In this way, the common management application 120 can be conveniently extended to support various proprietary protocols. It is to be understood, however, that such protocol translation can occur in other ways. For example, the software or firmware executing on each managed device 104 or the other entities 136 can be updated to natively use the common southbound interface 138 or common northbound interface 140, respectively, instead of or in addition to a proprietary interface and/or a southbound or northbound translation entity can be installed and executed on the managed device 104 or the other entities 136, respectively, so that the translation between the relevant proprietary interface and the common southbound interface occurs on the managed device 104 or other entities 136. Also, southbound and northbound translation entities 142 and 144 can be executed on some other device in the network 100.

Also, the common management application 120 can be used to track information about the unmanaged devices 118 and the cabling 108 attached thereto (for example, by having someone manually enter the information about the unmanaged devices 118 and the cabling 108 attached thereto) into the common management application 120.

Figure 2:
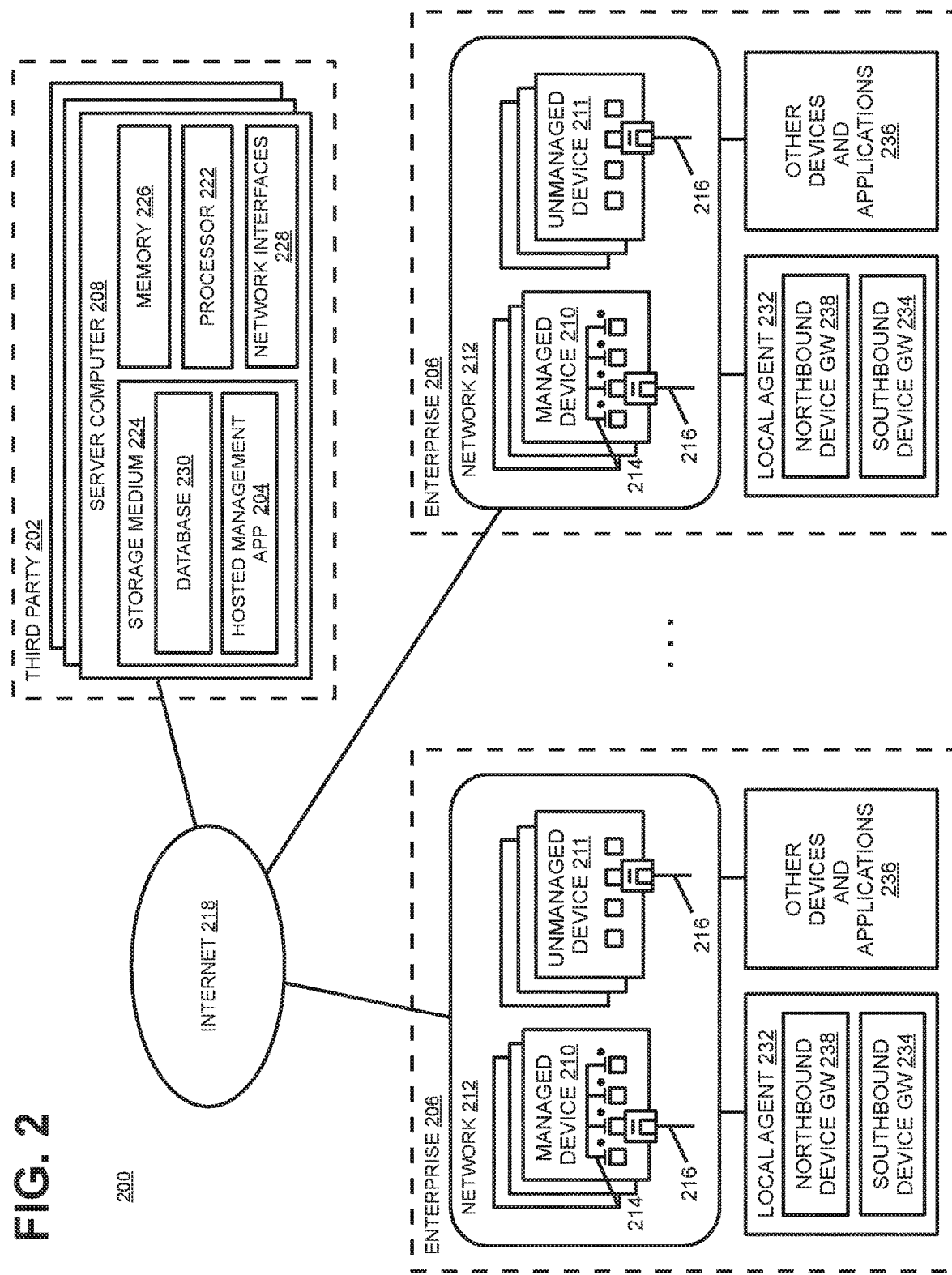
FIG. 2 is a block diagram of one exemplary embodiment of a system in which a third party hosts management applications for multiple enterprises on server computers maintained by the third party.

FIG. 2 is a block diagram of one exemplary embodiment of a system 200 in which a third party 202 hosts management applications 204 for multiple enterprises 206 on server computers 208 maintained by the third party 202.

In the exemplary embodiment shown in FIG. 2, each of the multiple enterprises (for example, businesses, government organizations, schools, and other for-profit and non-profit organizations) 206 deploys managed devices 210 in a network 212 the enterprise 206 implements for use in that enterprise 206.

As with the managed devices 104 described above in connection with FIG. 1, the managed devices 210 deployed in the network 212 of each enterprise 206 include some type of physical layer information data acquisition technology 214 for automatically obtaining physical layer information related to cabling 216 that is attached to the managed devices 210.

Instead of having each enterprise 206 deploy and maintain within the enterprise 206 its own management application for aggregating physical layer information obtained by the managed devices 210 in the enterprise's network 212, a respective management application 204 for each enterprise 206 is hosted on the server computers 208 that are maintained by the third party 202. Physical layer information obtained by the managed devices 210 deployed in the enterprise's network 212 is communicated to the respective management application 204 over the Internet 218, which aggregates the physical layer information for the devices 210 deployed in the associated enterprise's network 212.

In the exemplary embodiment shown in FIG. 2, each hosted management application 204 is implemented as software that executes on one or more of the server computers 208 maintained by the third party 202.

In the exemplary embodiment shown in FIG. 2, each server computer 208 comprises one or more programmable processors 222 for executing the software. The software comprises program instructions that are stored (or otherwise embodied) on or in an appropriate non-transitory storage medium or media 224 (such as flash or other non-volatile memory, magnetic disc drives, and/or optical disc drives) from which at least a portion of the program instructions are read by the programmable processor 222 for execution thereby. Although the storage media 224 is shown in FIG. 2 as being included in, and local to, the respective server computer 208, it is to be understood that remote storage media (for example, storage media that is accessible over a network) and/or removable media can also be used. Each server computer 208 also includes memory 226 for storing the program instructions (and any related data) during execution by the programmable processor 222. Memory 226 comprises, in one implementation, any suitable form of random access memory (RAM) now known or later developed, such as dynamic random access memory (DRAM). In other embodiments, other types of memory are used. Each server computer 208 also includes one or more network interfaces 228 for communicatively coupling the server computer 208 to a network (not shown) maintained by the third party 202 and, ultimately the Internet 218.

Each hosted management application 204 includes or is coupled to a database or other data store 230 for storing the physical layer information provided to it.

Although not illustrated in FIG. 2 for ease of illustration, virtualization technology can be (and typically would be) used to provide a separate virtualized server instance for each enterprise 206, where each such virtualized server instance is used to execute the management application 204 for that enterprise 206. Virtualized server instances for multiple enterprises 206 can be run by a single server computer 208. Sever load balancing techniques can be used to balance the load of hosting of the management applications 204 for all of the enterprises 206 using the server computers 208.

In the exemplary embodiment shown in FIG. 2, each enterprise 206 executes a local agent 232 within the enterprise's network 212. The local agent 232 is configured to implement a southbound interface gateway 234 between the managed devices 210 in each enterprise's network 212 and the hosted management application 204 deployed on the server computers 208 of the third party 202. The southbound interface gateway 234 in each local agent 232 is configured to appear and function, from the perspective of the managed devices 210 deployed in the enterprise's network 212, as a locally deployed management application. For example, the southbound interface gateway 234 can be configured to implement the discovery protocols that the managed devices 210 are configured to use for being discovered by a management application and for discovering a management application to be managed by. Also, the southbound interface gateway 234 can be configured to forward certain messages between the managed devices 210 and the hosted management application 204 deployed on the server computers 208 of the third party 202 (for example, messages sent from the managed devices 210 that include physical layer information obtained by the managed devices 210 or status and alarm information and messages sent from the corresponding hosted management application 204 requesting information from a managed device 210 or configuring a managed device 210).

In this way, a hosted management application 204 can be used even if the managed devices 210 deployed by the enterprise 206 do not natively support interacting with a hosted management application 204. This is beneficial because an enterprise 206 may have already invested in a large number of such managed devices 210 at the time the enterprise 206 wishes to switch to using a hosted management application 204 and upgrading or replacing such devices 210 all at one time may be difficult or costly.

In the exemplary embodiment shown in FIG. 2, other devices and applications 236 in each enterprise 206 access the physical layer information maintained by the hosted management application 204 for that enterprise 206. These other devices and applications 236 are also referred to here as the "other entities 236". This access can include retrieving information from the respective hosted management application 204 as well as supplying information to that hosted management application 204.

In this example, the local agent 232 deployed in each enterprise 206 also implements a northbound interface gateway 238 between the other entities 236 in each enterprise's network 212 and the hosted management application 204 deployed on the server computers 208 of the third party 202. The northbound interface gateway 238 in each local agent 232 is configured to appear and function, from the perspective of the other entities 236 deployed in the enterprise's network 212, as a locally deployed management application. For example, the northbound interface gateway 238 can be configured to implement the discovery protocols that the other entities 236 are configured to use for being discovered by a management application and for discovering a management application to interact with. Also, the northbound interface gateway 238 can be configured to forward certain messages between the other entities 236 and the hosted management application 204 deployed on the server computers 208 of the third party 202 (for example, messages sent from the other entities 236 requesting physical layer information stored in the database 230 and messages sent from the corresponding hosted management application 204 providing the requested information).

Each local agent 232 can be configured to interact with the respective hosted management application 204 by initiating an HTTP session with the hosted management application 204. Each such HTTP session can then be used for bi-directional communications between that local agent 232 and the host management application 204. In this way, any firewalls that exist between local agent 232 and the hosted management application 204 can be traversed without specially configuring the firewalls since firewalls are commonly configured to permit HTTP sessions to between established between entities within an enterprise network and an external server. Other firewall circumvention techniques can be used, as well as configuring the relevant firewalls to open ports for such communications.

In the exemplary embodiment shown in FIG. 2, some of the managed devices 210 and the other entities 236 are configured to communicate directly with the hosted management application 204 and do not need to interact via the local agent 232.

Also, each hosted management application 204 can be used to track information about one or more unmanaged devices 211 included in the associated enterprise's network 212 (for example, by having someone use a browser-based interface implemented by the host management application 204 to manually enter information about the unmanaged devices 211 and the cabling 216 attached thereto).

An enterprise 206 can use a combination of locally deployed management applications and hosted management applications 204.

Also, although only a single local agent 232 is shown in FIG. 2, it is to be understood that multiple local agents 232 can be used in a given enterprise's network 212 and that the southbound device gateway 238 and the northbound device gateway 240 need not be implemented on the same local agent 232 device.

The hosted management applications 204 can be used with a heterogeneous PLM system as described above in connection with FIG. 1, where the hosted management application 204 is configured to operate as a common management application of the type described in connection with FIG. 1.

By hosting the management application 204 on servers 208 maintained by a third party 202, an enterprise 206 need not devote internal resources to doing so, which may be desirable for some enterprises.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

Example Embodiments

Example 1 includes a heterogeneous physical layer management system comprising: first devices each comprising first physical layer information acquisition technology to obtain physical layer information about cabling attached to the first devices; second devices each comprising second physical layer information acquisition technology to obtain physical layer information about cabling attached to the second devices, wherein the second physical layer information acquisition technology differs from the first physical layer information acquisition technology; and a common management application communicatively coupled to the first devices and the second devices, wherein the common management application is configured to aggregate physical layer information from the first devices and the second devices.

Example 2 includes the system of Example 1, wherein the common management application comprises a translation entity that enables the common management application to interact with the first devices using a proprietary interface used by the first devices to interact with a proprietary management application.

Example 3 includes the system of any of the Examples 1-2, wherein the common management application comprises a translation entity that enables the common management application to interact with other entities using a proprietary interface used by the other entities to interact with a proprietary management application.

Example 4 includes the system of any of the Examples 1-3, wherein the first physical layer information acquisition technology comprises at least one of EEPROM-based technology, RFID technology, ninth wire technology, and inference-based technology; and wherein the second physical layer information acquisition technology comprises at least one of EEPROM-based technology, RFID technology, ninth wire technology, and inference-based technology.

Example 5 includes the system of any of the Examples 1-4, wherein the common management application is further configured to aggregate physical layer information about unmanaged devices. Example 6 includes the system of any of the Examples 1-5, wherein the common management entity is hosted by a third-party that offers the common management entity as a hosted service.

Example 7 includes a method comprising: acquiring physical layer information from first devices using a first physical layer information acquisition technology; acquiring physical layer information from second devices using a second physical layer information acquisition technology, wherein the first physical layer information acquisition technology differs from the second physical layer information acquisition technology; and aggregating physical layer information from the first devices and the second devices in a common management application.

Example 8 includes the method of Example 7, wherein aggregating physical layer information from the first devices and the second devices in the common management application comprises translating messages to enable the common management application to interact with the first devices using a proprietary interface used by the first devices to interact with a proprietary management application. Example 9 includes the method of any of the Examples 7-8, further comprising translating messages to enable the common management application to interact with other entities using a proprietary interface used by the other entities to interact with a proprietary management application.

Example 10 includes the method of any of the Examples 7-9, wherein the first physical layer information acquisition technology comprises at least one of EEPROM-based technology, RFID technology, ninth wire technology, and inference-based technology; and wherein the second physical layer information acquisition technology comprises at least one of EEPROM-based technology, RFID technology, ninth wire technology, and inference-based technology. Example 11 includes the method of any of the Examples 7-10, further comprising aggregating physical layer information related to unmanaged devices.

Example 12 includes a method comprising: acquiring physical layer information about a plurality of networks, each of the networks operated by a different enterprise; and aggregating physical layer information about each of the plurality of networks by a third party as a hosted service. Example 13 includes the method of Example 12, wherein aggregating physical layer information about each of the plurality of networks by the third party as a hosted service comprises: maintaining, by the third party, a respective one or more virtual server instances for each of the plurality of networks; and for each of the plurality of networks, aggregating physical layer information that network using the one or more virtual server instances associated with that network.

Example 14 includes the method of any of the Examples 12-13, wherein aggregating physical layer information about each of the plurality of networks by the third party comprises load balancing, across a plurality of server resources, processing associated with aggregating physical layer information about each of the plurality of networks. Example 15 includes the method of any of the Examples 12-14, further comprising: running, for each of the plurality of networks, a respective one or more local agents within the network that communicates physical layer information acquired for the network to the third party. Example 16 includes the method of Example 15, further comprising, for each of the plurality of networks, using a respective one or more HTTP sessions that are initiated by the respective local agents running within the network.

Example 17 includes the method of any of the Examples 12-16, wherein acquiring physical layer information about the plurality of networks comprises, for at least one network, using at least one of the following to acquire the physical layer information: one or more of EEPROM-based technology, RFID technology, ninth wire technology, and inference-based technology. Example 18 includes the method of any of the Examples 12-17, wherein acquiring physical layer information about the plurality of networks comprises, for at least one network, acquiring physical layer information related to unmanaged devices.

Example 19 includes a server system comprising: one or more server computers operated by a third party; wherein the one or more server computers are configured to aggregate physical layer information about each of a plurality of networks as a hosted service, wherein each of the plurality of networks is operated by a different enterprise.

Example 20 includes the server of Example 19, wherein the one or more server computers are configured to aggregate physical layer information about unmanaged devices.

What is claimed is:

1. A method comprising:
   acquiring, using one or more physical layer information acquisition technologies, physical layer information related to cabling attached to first managed devices within a first enterprise network, wherein the first enterprise network is configured to be operated by a first enterprise;
   acquiring, using one or more physical layer information data acquisition technologies, physical layer information related to cabling attached to second managed devices within a second enterprise network, wherein the second enterprise network is distinct from the first enterprise network, wherein the second enterprise network is configured to be operated by a second enterprise distinct from the first enterprise; and
   aggregating, with at least one management application hosted on one or more server computers in a third network distinct from the first enterprise network and the second enterprise network, the physical layer information related to cabling attached to the first managed devices within the first enterprise network and the second managed devices within the second enterprise network by a third party as a hosted service, wherein the third network is configured to be operated by the third party distinct from the first enterprise and the second enterprise.

2. The method of claim 1, wherein aggregating physical layer information related to cabling attached to the first managed devices within the first enterprise network and the second managed devices within the second enterprise network by the third party as a hosted service comprises:
   maintaining, by the third party, a respective one or more virtual server instances for the first enterprise network and the second enterprise network; and
   for the first enterprise network and the second enterprise network, aggregating physical layer information related to cabling attached to managed devices of that respective enterprise network using the respective one or more virtual server instances associated with that respective enterprise network.

3. The method of claim 1, wherein aggregating physical layer information related to cabling attached to the first managed devices within the first enterprise network and the second managed devices within the second enterprise network by the third party comprises load balancing, across a plurality of server resources, processing associated with aggregating physical layer information related to cabling attached to the first managed devices within the first enterprise network and the second managed devices within the second enterprise network.

4. The method of claim 1, further comprising:
   running, for the first enterprise network and the second enterprise network, a respective one or more local agents within the enterprise network that communicates physical layer information acquired for the respective enterprise network to the third network.

5. The method of claim 4, further comprising, for the first enterprise network and the second enterprise network, using a respective one or more HTTP sessions that are initiated by the respective local agents running within the enterprise network.

6. The method of claim 1, wherein, for the first enterprise network and the second enterprise network, the one or more physical layer information acquisition technologies include at least one of EEPROM-based technology, RFID technology, ninth wire technology, or inference-based technology.

7. The method of claim 1, further comprising, for the first enterprise network and the second enterprise network, acquiring physical layer information related to unmanaged devices.

8. The method of claim 1, wherein the one or more physical layer information acquisition technologies includes a first physical layer information acquisition technology and a second physical layer information acquisition technology, wherein the second physical layer information acquisition technology differs from the first physical layer information acquisition technology.

9. A server system comprising:
   one or more server computers in a first network, wherein the one or more server computers are configured to host at least one management application;
   wherein the at least one management application is configured to aggregate physical layer information related to cabling attached to first managed devices within a first enterprise network and second managed devices within a second enterprise network by a third party as a hosted service, wherein the first network is distinct from the first enterprise network and the second enterprise network, wherein the physical layer information is acquired using one or more physical layer information acquisition technologies,
   wherein the first network is configured to be operated by the third party, wherein the first enterprise network is configured to be operated by a first enterprise and the second enterprise network is configured to be operated by a second enterprise distinct from the first enterprise, wherein the third party is distinct from the first enterprise and the second enterprise.

10. The server system of claim 9, wherein the at least one management application hosted on the one or more server computers in the first network is configured to aggregate physical layer information about unmanaged devices.

11. The server system of claim 9, wherein the at least one management application hosted on the one or more server computers in the first network is to aggregate physical layer information obtained by managed devices in the first enterprise network and the second enterprise network.

12. The server system of claim 9, wherein the one or more server computers are configured to:
   maintain a respective one or more virtual server instances for the first enterprise network and the second enterprise network; and
   for each respective enterprise network of the first enterprise network and the second enterprise network, aggregate physical layer information for the respective enterprise network using the respective one or more virtual server instances associated with the respective enterprise network.

13. The server system of claim 9, wherein the one or more server computers are configured to load balance, across a plurality of server resources, processing associated with aggregating physical layer information about the first enterprise network and the second enterprise network.

14. The server system of claim 9, wherein the first enterprise network and the second enterprise network are configured to run, a respective one or more local agents within the respective enterprise network that communicates physical layer information acquired for the enterprise network to the at least one hosted management application.

15. The server system of claim 14, wherein the respective one or more local agents within the respective enterprise network are configured to implement a respective gateway between the managed devices of the respective enterprise network and a respective hosted management application hosted on the one or more server computers.

16. The server system of claim 15, wherein the respective gateway is configured to appear and function as a locally deployed management application in the first network to the respective managed devices of the first enterprise network and the second enterprise network.

17. The server system of claim 14, wherein the respective one or more local agents within the respective enterprise network are configured to implement a gateway between other entities and a hosted management application hosted on the one or more server computers.

18. The server system of claim 14, wherein the one or more server computers are configured to, for each of the first enterprise network and the second enterprise network, use a respective one or more HTTP sessions that are initiated by the respective local agents running within the respective enterprise network.

19. The server system of claim 9, wherein the physical layer information about the first enterprise network and the second enterprise network is acquired using one or more of an EEPROM-based technology, a RFID technology, ninth wire technology, and inference-based technology.

20. The server system of claim 9, wherein the one or more physical layer information acquisition technologies includes a first physical layer information acquisition technology and a second physical layer information acquisition technology, wherein the second physical layer information acquisition technology differs from the first physical layer information acquisition technology.

\* \* \* \* \*